(12) United States Patent
Tadepalli

(10) Patent No.: US 8,922,652 B2
(45) Date of Patent: Dec. 30, 2014

(54) SYSTEMS AND METHODS FOR LOCATING FAULTS IN A POWER SYSTEM

(75) Inventor: Venu Madhav Tadepalli, Alpharetta, GA (US)

(73) Assignee: General Electric Company, Schenectady, NY (US)

( * ) Notice: Subject to any disclaimer, the term of this patent is extended or adjusted under 35 U.S.C. 154(b) by 482 days.

(21) Appl. No.: 13/220,127

(22) Filed: Aug. 29, 2011

(65) Prior Publication Data

US 2013/0050478 A1  Feb. 28, 2013

(51) Int. Cl.
| | | |
|---|---|---|
| *H04N 9/47* | (2006.01) | |
| *H04N 7/18* | (2006.01) | |
| *G06K 9/00* | (2006.01) | |
| *G06T 7/00* | (2006.01) | |

(52) U.S. Cl.
CPC ............. *G06K 9/0063* (2013.01); *G06T 7/001* (2013.01); *G06T 2207/10032* (2013.01); *G06T 2207/30184* (2013.01)
USPC .......................................... 348/143; 348/144

(58) Field of Classification Search
USPC ................................. 348/143, 144
See application file for complete search history.

(56) References Cited

U.S. PATENT DOCUMENTS

| | | | |
|---|---|---|---|
| 6,477,475 | B1 | 11/2002 | Takaoka et al. |
| 6,597,180 | B1 * | 7/2003 | Takaoka et al. ............... 324/512 |
| 6,822,457 | B2 | 11/2004 | Borchert et al. |
| 6,879,917 | B2 | 4/2005 | Turner |
| 7,286,963 | B2 | 10/2007 | Saha et al. |
| 2008/0130179 | A1 | 6/2008 | Gajic et al. |
| 2009/0150099 | A1 | 6/2009 | Balcerek et al. |
| 2009/0225479 | A1 | 9/2009 | Jayanth et al. |
| 2010/0277181 | A1 | 11/2010 | Saha et al. |
| 2010/0289642 | A1 * | 11/2010 | Harrison ....................... 340/541 |
| 2012/0287273 | A1 * | 11/2012 | Arjona Antolin et al. .... 348/144 |

OTHER PUBLICATIONS

Kezunovic, Mladen and Ce Zheng, Sychronized Sampling Uses for Real-Time Monitoring and Control/RTGRM, Sep. 2008, Texas Engineering Experiment Station.*

* cited by examiner

*Primary Examiner* — Chikaodili E Anyikire
(74) *Attorney, Agent, or Firm* — Armstrong Teasdale LLP

(57) ABSTRACT

A system for use in locating a fault in a power generation and delivery system is provided. The system includes a fault detection module configured to detect an occurrence of the fault and to generate a fault event notification, a satellite imaging system configured to acquire satellite image data, and a fault location module coupled to the fault detection module and to the satellite imaging system, the fault location module configured to receive the fault event notification from the fault detection module, receive satellite image data of a target area that includes the fault from the satellite imaging system, and determine the location of the fault based on the satellite image data.

17 Claims, 4 Drawing Sheets

SYSTEMS AND METHODS FOR LOCATING FAULTS IN A POWER SYSTEM

BACKGROUND OF THE INVENTION

The subject matter disclosed herein relates generally to power grids, and more specifically, methods and systems for use in identifying faults in power grids.

Power generated by an electric utility is typically delivered to a plurality of consumers via an electric grid. Because of fault events including inclement weather, tree limbs, fire, and/or transformer failure, for example, power transmission lines coupled in the electric grid may be damaged and/or rendered inoperable. In at least some known fault detection systems, faults are detected by measuring one or more electrical properties across the electric grid. Once a fault is detected, a repair crew is typically dispatched to repair the damaged and/or inoperable power line.

Using at least some known fault detection systems, the exact location of the fault may be difficult to determine. As a result, repair crews may spend a substantial amount of valuable time attempting to find the exact location of the fault. Moreover, in at least some known fault detection systems, repair crews do not know the cause of the fault until they arrive at the fault. Accordingly, repair crews may arrive at the fault without the necessary tools, equipment, and/or capability to repair the fault.

BRIEF DESCRIPTION OF THE INVENTION

In one aspect, a system for use in locating a fault in a power generation and delivery system is provided. The system includes a fault detection module configured to detect an occurrence of the fault and to generate a fault event notification, a satellite imaging system configured to acquire satellite image data, and a fault location module coupled to the fault detection module and to the satellite imaging system, the fault location module configured to receive the fault event notification from the fault detection module, receive satellite image data of a target area that includes the fault from the satellite imaging system, and determine the location of the fault based on the satellite image data.

In another aspect, a computing device for use in locating a fault in a power generation and delivery system is provided. The computing device includes a memory device configured to store satellite image data, and a processor coupled to the memory device, the processor configured to receive a fault event notification, retrieve satellite image data of a target area containing the fault from the memory device, and determine the location of the fault based on the satellite image data.

In yet another aspect, a method for determining a location of a fault in a power generation and delivery system is provided. The method includes detecting an occurrence of the fault, acquiring satellite image data of a target area containing the fault, and determining the location of the fault based on the satellite image data.

DETAILED DESCRIPTION OF THE INVENTION

The systems and methods described herein enable a location of a fault to be detected in a power generation and delivery system. A satellite imaging system acquires image data of a target area that includes the fault. Once the fault is detected, a processor determines the location of the fault based on the satellite image data. The processor may locate the fault by identifying an anomaly in the satellite image data, by comparing an image taken before the fault occurred and an image taken after the fault occurred, and/or by merging geographic information system (GIS) data with the satellite image data. Moreover, the processor may determine the cause of the fault based on the satellite image data.

Technical effects of the methods and systems described herein include at least one of: (a) detecting occurrences of a fault in a power generation and delivery system; (b) acquiring satellite image data of a target area containing the fault; and (c) determining the location of the fault based on the satellite image data.

Figure 1:
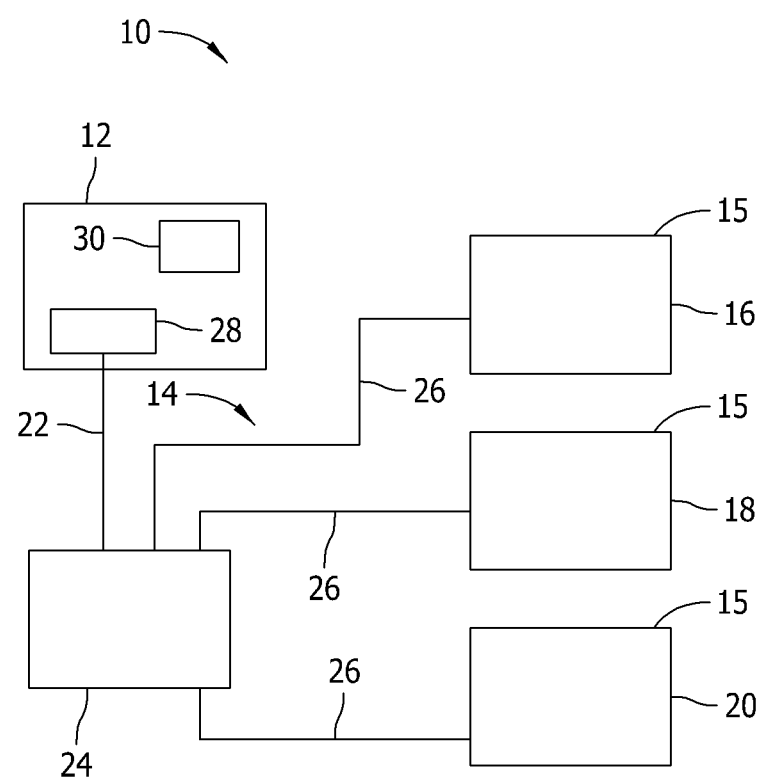
FIG. 1 is a block diagram of an exemplary electric power generation and delivery system.

FIG. 1 is a block diagram of an exemplary electric power generation and delivery system 10. In the exemplary embodiment, electric power generation and delivery system 10 includes an electric utility 12, an electrical grid 14, and a plurality of customer or energy consumer locations 15, for example, a first customer location 16, a second customer location 18, and a third customer location 20. In the exemplary embodiment, electricity is delivered from electric utility 12 to customer locations 16, 18, and 20 via electrical grid 14. Furthermore, in the exemplary embodiment, electrical grid 14 includes at least one transmission line 22, an electrical substation 24, and a plurality of distribution lines 26. Moreover, in the exemplary embodiment, electric utility 12 includes an electric power generation system 28 that supplies electrical power to electrical grid 14. Electric power generation system 28 may include a generator driven by, for example, a gas turbine engine, a hydroelectric turbine, and/or a wind turbine. Alternatively, electric power generation system 28 may utilize solar panels and/or any other electricity generating device that enables system 10 to function as described herein.

In the exemplary embodiment, electric utility 12 also includes a distribution control center substation 30 that controls energy production and delivery. Distribution control center substation 30 is illustrated as being included within electric utility 12, however, it should be noted that distribution control center substation 30 may be external to electric utility 12 (e.g., remotely located) and may be in communication with electric utility 12. Furthermore, although described as including a computer system, distribution control center substation 30 may include any suitable processing device that enables electric power generation and delivery system 10 to function as described herein. The term processing device, as used herein, refers to central processing units, microprocessors, microcontrollers, reduced instruction set circuits (RISC), application specific integrated circuits (ASIC), logic circuits, and any other circuit or processor capable of executing the functions described herein.

During operation, one or more components of power generation and delivery system 10 may encounter a fault. As used herein, a "fault" refers to any failure and/or malfunction of one or more components of power generation and delivery system 10. For example, transmission line 22 and/or distribution lines 26 may be damaged due to inclement weather, tree limbs, transformer failures, and/or fires. Such faults may prevent system 10 from delivering power to customer locations 16, 18, and 20. To repair a fault in system 10 and to enable power delivery to be restored to customer locations 16, 18, and 20, the location of the fault must be identified.

Figure 2:
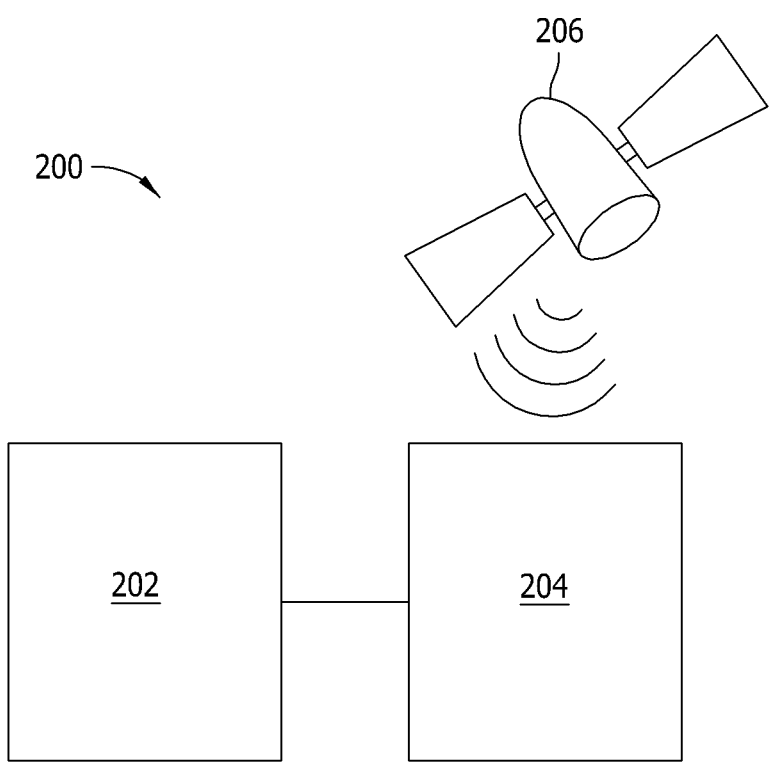
FIG. 2 is a block diagram of an exemplary system for use in locating faults that may be used with the power system shown in FIG. 1.

FIG. 2 is a block diagram of an exemplary system 200 for use in locating faults and that may be used with power generation and delivery system 10 (shown in FIG. 1). System 200 includes a fault detection module 202 coupled to a fault location module 204. A satellite imaging system 206 is communicatively coupled to fault location module 204.

Satellite imaging system 206 acquires satellite image data of power generation and delivery system 10 and transmits image data to fault location module 204, as described in more detail below. In the exemplary embodiment, fault location module 204 is a computing device that determines the geographic location of a fault, as described in detail below.

Satellite imaging system 206 periodically acquires satellite image data of a geographic region that includes power generation and delivery system 10. Accordingly, in the event of a fault, satellite imaging system 206 acquires data of a target area that includes the fault. In the exemplary embodiment, satellite imaging system 206 acquires satellite image data every fifteen seconds. Alternatively, satellite imaging system 206 may acquire image data at any frequency that enables system 200 to function as described herein. Satellite imaging system 206 transmits the acquired satellite image data to system 200, and the transmitted satellite image data is stored on system 200, as described in detail below.

Fault detection module 202 detects the occurrence of a fault event. More specifically, in the exemplary embodiment, fault detection module 202 detects a fault event in power generation and delivery system 10 using one or more calculations. For example, fault detection module 202 may detect a fault event by determining a change in impedance of transmission line 22 and/or in distribution lines 26. Alternatively, fault detection module 202 may detect a fault event using any other technique that enables system 200 to function as described herein.

After fault detection module 202 detects a fault event, fault detection module 202 transmits a fault event notification to fault location module 204. In the exemplary embodiment, the fault event notification includes a time stamp indicative of the time the fault event was detected. The fault event notification also includes the target area of the fault. That is, fault detection module 202 determines the general geographic area in which the fault is located. For example, fault detection module 202 may determine that a fault occurred somewhere along a one mile stretch of transmission line 22 (shown in FIG. 1). Fault location module 204 receives the fault event notification from fault detection module 202 and determines the location of the fault, as described in more detail below.

Figure 3:
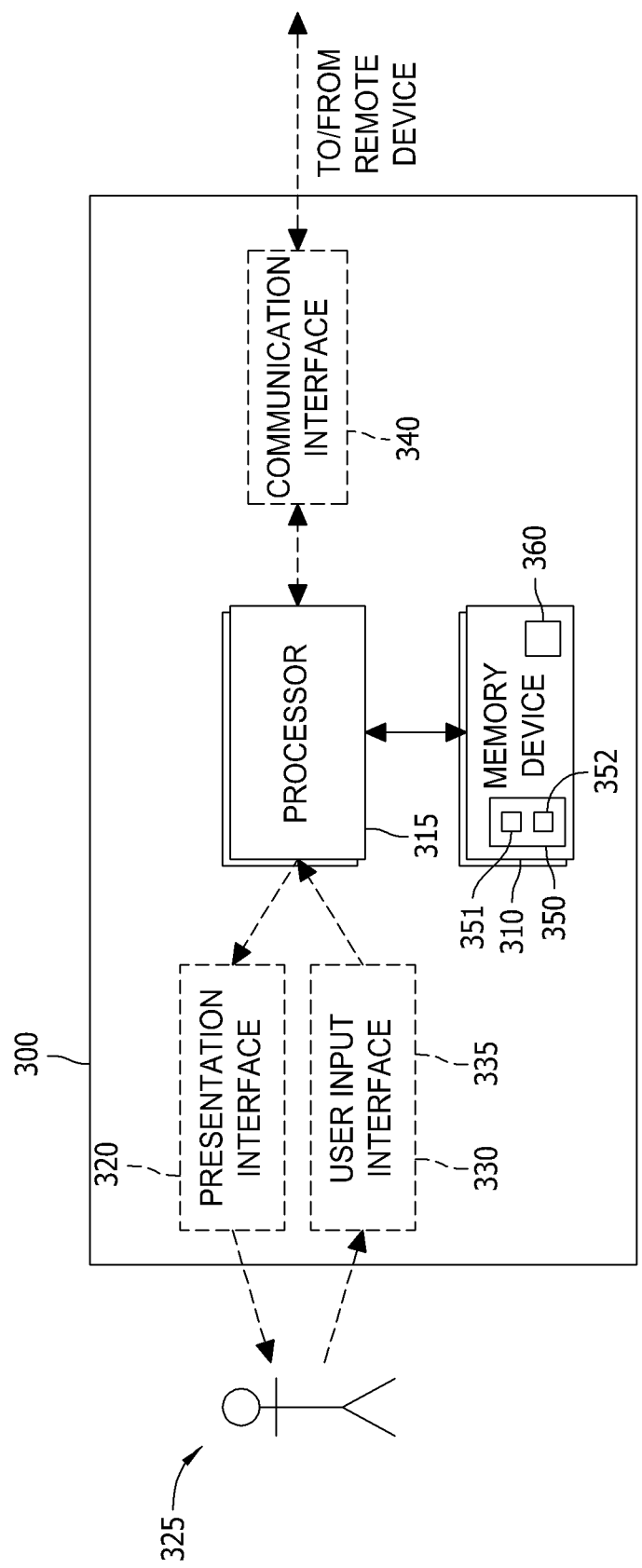
FIG. 3 is a block diagram of an exemplary computing device that may be used with the system shown in FIG. 2.

FIG. 3 is a block diagram of an exemplary computing device 300 that may be used with fault location module 204 (shown in FIG. 2). Computing device 300 includes at least one memory device 310 and a processor 315 that is coupled to memory device 310 for executing instructions. In some embodiments, executable instructions are stored in memory device 310. Computing device 300 performs one or more operations described herein by programming processor 315. For example, processor 315 may be programmed by encoding an operation as one or more executable instructions and by providing the executable instructions in memory device 310. Processor 315 may include one or more processing units (e.g., in a multi-core configuration).

Memory device 310 is one or more devices that enable information such as executable instructions and/or other data to be stored and retrieved. Memory device 310 may include one or more computer readable media, such as, without limitation, dynamic random access memory (DRAM), static random access memory (SRAM), a solid state disk, and/or a hard disk. Memory device 310 may be configured to store, without limitation, application source code, application object code, source code portions of interest, object code portions of interest, configuration data, execution events and/or any other type of data.

In some embodiments, computing device 300 includes a presentation interface 320 that is coupled to processor 315. Presentation interface 320 presents information, such as application source code and/or execution events, to a user 325. For example, presentation interface 320 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 320 includes one or more display devices.

In some embodiments, computing device 300 includes an input interface 330, such as a user input interface 335. In the exemplary embodiment, user input interface 335 is coupled to processor 315 and receives input from user 325. User input interface 335 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 320 and user input interface 335.

In the exemplary embodiment, computing device 300 includes a communication interface 340 coupled to processor 315. Communication interface 340 communicates with one or more remote devices. In the exemplary embodiment, communication interface 340 communicates with fault detection module 202 and satellite imaging system 206. To communicate with remote devices, communication interface 340 may include, for example, a wired network adapter, a wireless network adapter, and/or a mobile telecommunications adapter.

In the exemplary embodiment, computing device 300 receives satellite image data 350 from satellite imaging system 206 (Shown in FIG. 2). Satellite image data 350 is stored in memory device 310. In the exemplary embodiment, to facilitate an availability of storage space on memory device 310, memory device 310 only stores two images of satellite image data 350 at a time. Alternatively, memory device 310 may store any number of satellite images.

In the event of a fault, computing device 300 receives a fault event notification from fault detection module 202 (FIG. 2). In the exemplary embodiment, based on the time the fault event was detected, processor 315 retrieves from memory device 310 a "before" image 351 that represents the satellite image of the target area acquired immediately before the fault event was detected and an "after" image 352 that represents the satellite image of the target area acquired immediately after the fault event was detected. Processor 315 compares the before image 351 and the after image 352 to determine the exact location of the fault on images 351 and 352.

To determine the location of the fault, in the exemplary embodiment, processor 315 identifies one or more anomalies present in the after image 352 that are not present in the before image 351. For example, processor 315 may identify a burned region, a devastated region, and/or a blackout region in the after image 352 that is not present in the before image 351. By identifying anomalies, processor 315 is able to identify the location of the fault from images 351 and 352.

In the exemplary embodiment, processor 315 determines the cause of the fault from the identified anomaly. For example, if the identified anomaly is a burn region, processor 315 determines that the fault was caused by fire damage to a transmission line and/or distribution line. If the identified anomaly is a tree that has fallen over, processor 315 determines the fault was caused by a tree falling on the transmission and/or distribution line.

Memory device 310 also stores geographic information system (GIS) data 360 in the exemplary embodiment. GIS data 360 may include, for example, digital map data, the geographic location of one or more geographical features, digital elevation data, and/or digital survey data. To further pinpoint the location of the fault, processor 315 merges satellite image data 350, such as the before image 351 and the after image 352, with GIS data 360. For example, in one embodiment, the after image 352 is superimposed on digital map data. Accordingly, in the exemplary embodiment, processor 315 utilizes GIS data 360 to determine the exact location of the fault. For example, processor 315 may use GIS data 360 to determine the latitude and longitude coordinates of the fault.

After processor 315 determines the location of the fault, the location is displayed on presentation interface 320. For example, presentation interface 320 may display the after image 352 with the fault identified via highlighting and/or other identifying/distinguishing indicia. Alternatively, presentation interface 320 may display digital map data and the coordinates of the fault. The cause of the fault (e.g., fire, devastation, and/or transformer failure) may also be displayed on presentation interface 320.

Utilizing presentation interface 320, a user 325 can quickly and accurately determine the location of a fault. Furthermore, from the fault information displayed on presentation interface 320, user 325 can determine whether any geographical features obstruct access to the fault, such as a river, a canyon, and/or a mountain. Moreover, knowing the cause of the fault, user 325 can determine whether any special tools and/or equipment will be required to repair the fault. Accordingly, utilizing system 200, repair crews responsible for repairing the fault can be advised, prior to dispatch, of the exact location of the fault, any obstructions to accessing the fault, the cause of the fault, and/or any particular tools and/or equipment needed to repair the fault.

Figure 4:
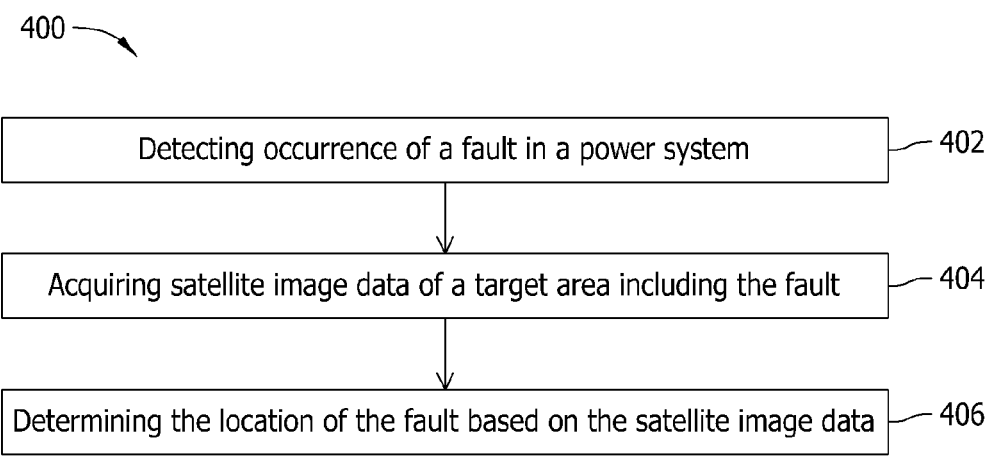
FIG. 4 is a flowchart of an exemplary method for use in locating faults that may be used with the system shown in FIG. 2.

FIG. 4 is an exemplary method 400 that may be used to determine the location of a fault in a power generation and delivery system, such as power generation and delivery system 10 (shown in FIG. 1). Method 400 includes detecting 402 occurrence of the fault in the power generation and delivery system. The fault may be detected using, for example, fault detection module 202. Further, satellite image data of a target area is acquired 404, for example, using satellite imaging system 206. Based on the satellite image data, the location of the fault is determined 406. For example, fault location module 204, including processor 315, may be used to determine the location of the fault. The fault location may be determined by identifying an anomaly in the satellite image data, comparing an image taken before the fault occurred and an image taken after the fault occurred, and/or merging GIS data with the satellite image data.

As compared to known fault detection and location systems, the systems and methods described herein utilize satellite imaging data to quickly and accurately locate faults. By accurately identifying the location of a fault, repair crews can be quickly dispatched to the exact location without having to search for the fault within a larger area. The systems and methods described herein also facilitate identifying the cause of the fault. Accordingly, as compared to known systems, using the embodiments discussed herein, a user can identify whether any particular tools and/or equipment will be required by a repair crew to repair the fault. Finally, by viewing the satellite image data, users can determine whether any geographical features obstruct access to the fault, and generate alternate routes for repair crews if necessary.

The systems and methods described herein enable a location of a fault to be detected in a power generation and delivery system. A satellite imaging system acquires image data of a target area that includes the fault. Once the fault is detected, a processor determines the location of the fault based on the satellite image data. The processor may locate the fault by identifying an anomaly in the satellite image data, by comparing an image taken before the fault occurred and an image taken after the fault occurred, and/or by merging geographic information system (GIS) data with the satellite image data. Moreover, the processor may determine the cause of the fault based on the satellite image data.

Exemplary embodiments of systems and methods for locating a fault in a power system are described above in detail. The systems and methods described herein are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in locating a fault in a power generation and delivery system, said system comprising:
   a fault detection module configured to detect an occurrence of the fault and to generate a fault event notification;
   a satellite imaging system configured to acquire satellite image data; and
   a fault location module coupled to said fault detection module and to said satellite imaging system, said fault location module configured to:
   receive the fault event notification from said fault detection module;
   receive satellite image data of a target area that includes the fault from said satellite imaging system; and
   determine the location of the fault by comparing a satellite image taken before the fault occurred with a satellite image taken after the fault occurred.

2. A system in accordance with claim 1, wherein said fault location module is configured to determine the location of the fault by identifying at least one anomaly in the satellite image data.

3. A system in accordance with claim 2, wherein the at least one anomaly is at least one of a burn region, a devastation region, and a blackout region.

4. A system in accordance with claim 1, wherein said fault location module is further configured to determine the cause of the fault based on the satellite image data.

5. A system in accordance with claim 1, wherein said fault location module is further configured to merge geographic information system data with the satellite image data to determine the location of the fault.

6. A system in accordance with claim 1, wherein the fault event notification includes at least one of a time of detection of the fault and the target area.

7. A computing device for use in locating a fault in a power generation and delivery system, said computing device comprising:
 a memory device configured to store satellite image data; and
 a processor coupled to said memory device, said processor configured to:
  receive a fault event notification;
  retrieve satellite image data of a target area containing the fault from said memory device; and
  determine the location of the fault by comparing a satellite image taken before the fault occurred with a satellite image taken after the fault occurred.

8. A computing device in accordance with claim 7, wherein said processor is configured to determine the location of the fault by identifying at least one anomaly in the satellite image data.

9. A computing device in accordance with claim 8, wherein the at least one anomaly is at least one of a burn region, a devastation region, and a blackout region.

10. A computing device in accordance with claim 7, wherein said processor is further configured to determine the cause of the fault based on the satellite image data.

11. A computing device in accordance with claim 7, wherein said processor is further configured to merge geographic information system data with the satellite image data to determine the location of the fault.

12. A computing device in accordance with claim 11, wherein said processor is configured to merge geographic information system data with the satellite image data by superimposing a satellite image on digital map data.

13. A computing device in accordance with claim 7, further comprising:
 a display device coupled to said processor, wherein said processor is further configured to display the determined location of the fault on said display device.

14. A method for determining a location of a fault in a power generation and delivery system, said method comprising:
 detecting an occurrence of the fault;
 acquiring satellite image data of a target area containing the fault; and
 determining the location of the fault by comparing a satellite image taken before the fault occurred with a satellite image taken after the fault occurred.

15. A method in accordance with claim 14, further comprising merging geographic information system data with the satellite image data to determine the location of the fault.

16. A method in accordance with claim 14, wherein determining the location of the fault comprises identifying at least one anomaly in the satellite image data.

17. A method in accordance with claim 14, further comprising determining the cause of the fault based on the satellite image data.

* * * * *